(12) United States Patent
Kwon et al.

(10) Patent No.: US 10,302,175 B2
(45) Date of Patent: May 28, 2019

(54) VEHICLE TRANSMISSION

(71) Applicants:Hyundai Motor Company, Seoul (KR); Kia Motors Corporation, Seoul (KR)

(72) Inventors: Hyun Sik Kwon, Seoul (KR); Seong Wook Ji, Gunpo-si (KR); Won Min Cho, Hwaseong-si (KR); Seong Wook Hwang, Gunpo-si (KR); Ki Tae Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 7 days.

(21) Appl. No.: 15/831,225

(22) Filed: Dec. 4, 2017

(65) Prior Publication Data

US 2019/0085950 A1 Mar. 21, 2019

(30) Foreign Application Priority Data

Sep. 19, 2017 (KR) ........................ 10-2017-0128013

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| 7,771,305 | B1* | 8/2010 | Hart | F16H 3/666 |
| | | | | 475/282 |
| 2014/0364276 | A1* | 12/2014 | Tachibanada | B60W 10/10 |
| | | | | 477/93 |
| 2015/0247556 | A1* | 9/2015 | Takagi | F16H 3/66 |
| | | | | 475/278 |
| 2016/0348763 | A1* | 12/2016 | Kook | F16H 3/66 |

FOREIGN PATENT DOCUMENTS

KR  10-2013-0003981 A  1/2013

* cited by examiner

*Primary Examiner* — Colby M Hansen
(74) *Attorney, Agent, or Firm* — Morgan, Lewis & Bockius LLP

(57) ABSTRACT

A vehicle transmission includes: four planetary gear sets and six friction elements which may be combined such that the rotation speed and direction are changed by selectively interrupting operations using the rotation elements of the planetary gear sets and the plurality of friction elements, wherein with such a shifting action, the vehicle may be driven by implementing gear ratios of at least ten forward stages and at least one reverse stage.

9 Claims, 2 Drawing Sheets

FIG. 2

| GEAR STAGE | C1 | C2 | B1 | B2 | C3 | C4 | GEAR RATIO |
|---|---|---|---|---|---|---|---|
| 1 | ● |  | ● |  | ● |  | 4.986 |
| 2 | ● |  | ● | ● |  |  | 3.571 |
| 3 | ● |  |  | ● | ● |  | 2.616 |
| 4 | ● |  |  | ● |  | ● | 1.707 |
| 5 | ● | ● |  | ● |  |  | 1.370 |
| 6 |  | ● |  | ● |  | ● | 1.262 |
| 7 |  | ● |  |  | ● | ● | 1.000 |
| 8 |  | ● |  | ● | ● |  | 0.969 |
| 9 |  | ● | ● |  | ● |  | 0.922 |
| 10 |  | ● | ● | ● |  |  | 0.661 |
| REV. | ● |  | ● |  |  | ● | -3.400 |

VEHICLE TRANSMISSION

CROSS REFERENCE TO RELATED APPLICATION

The present application claims priority of Korean Patent Application No. 10-2017-0128013 filed on Sep. 29, 2017, the entire contents of which is incorporated herein for all purposes by this reference.

BACKGROUND OF THE INVENTION

Field of the Invention

The present invention relates to a vehicle transmission configured for improving fuel efficiency and power performance according to multi-staging.

Description of Related Art

Recently, rising oil prices have become a factor that has pushed global vehicle manufacturers to enter into extreme competition toward the improvement of fuel efficiency. In the case of an engine, global vehicle manufacturers are trying to reduce the weight and to improve the fuel efficiency through the downsizing of the engine.

Meanwhile, in the case of an automatic transmission, it is possible to secure both operability and fuel efficiency competitiveness through the multi-staging of the automatic transmission, among various fuel efficiency improvement methods.

However, as the number of transmission stages increases, the number of internal components forming the automatic transmission increases, which may deteriorate mounting performance and transmission efficiency and may increase material costs and weight.

Therefore, to increase fuel efficiency improvement through multi-staging, it may be important to devise a gear train structure that can maximize the efficiency with fewer parts.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle transmission configured for improving fuel efficiency and power performance according to multi-staging.

To achieve the above-described objects, there is provided a vehicle transmission including: an input shaft and an output shaft; a first planetary gear set, a second planetary gear set, a third planetary gear set, and a fourth planetary gear set, which are provided to transmit rotational force between the input shaft and the output shaft, and each of which may include three rotation elements; and six friction elements connected to the rotation elements of the planetary gear sets. A first rotation element of the first planetary gear set may be directly connected to a first rotation element of the second planetary gear set and a second rotation element of the third planetary gear set, and a second rotation element of the first planetary gear set may be directly connected to a third rotation element of the third planetary gear set and a third rotation element of the fourth planetary gear set. The third rotation element of the second planetary gear set may be directly connected to a first rotation element of the third planetary gear set, the third rotation element of the third planetary gear set may be directly connected to the third rotation element of the fourth planetary gear set, and a second rotation element of the fourth planetary gear set may be directly connected to the output shaft.

The first rotation element of the first planetary gear set may be selectively connectable to the input shaft by one of the friction elements and the third rotation element of the first planetary gear set may be selectively connectable to the input shaft by another one of the friction elements, the second rotation element of the second planetary gear set may be selectively fixed to the transmission housing by another one of the friction elements, the first rotation element of the third planetary gear set may be selectively connectable to the first rotation element of the fourth planetary gear set and the second rotation element of the fourth planetary gear set by another one of the friction elements, and the first rotation element of the fourth planetary gear set may be disposed on the transmission housing to be selectively fixable by another one of the friction elements.

The second rotation element of the second planetary gear set may be disposed on the transmission housing to be fixable by a first brake among the friction elements, and the first rotation element of the fourth planetary gear set may be disposed on the transmission housing to be fixable by a second brake among the friction elements.

The input shaft and the first rotation element of the first planetary gear set may be intermittently interconnected by a first clutch among the friction elements, the input shaft and the third rotation element of the first planetary gear set may be intermittently interconnected by a second clutch among the friction elements, the first rotation element of the third planetary gear set and the first rotation element of the fourth planetary gear set may be intermittently interconnected by a third clutch, and the first rotation element of the third planetary gear set and the second rotation element of the fourth planetary gear set may be intermittently interconnected by a fourth clutch.

The first planetary gear set, the second planetary gear set, and the fourth planetary gear set are single pinion planetary gear sets, and the third planetary gear set is a double pinion planetary gear set, and respective first rotation elements may be first, second, third and fourth sun gears, respective second rotation elements may be first, second, third and fourth planet carriers, and respective third rotation elements may be first, second, third and fourth ring gears.

There is also provided a vehicle transmission including a first planetary gear set, a second planetary gear set, a third planetary gear set, and a fourth planetary gear set, each of which may include three or more rotation elements. The vehicle transmission may further include: an input shaft connected to a first clutch and a second clutch; a first shaft connected to a first clutch, a first rotation element of the first planetary gear set, a first rotation element of the second planetary gear set, and a second rotation element of the third planetary gear set; a second shaft connected to a second rotation element of the first planetary gear set, a third rotation element of the third planetary gear set, and a third rotation element of the fourth planetary gear set; a third shaft connected to the second clutch and a third rotation element of the first planetary gear set; a fourth shaft connected to a first brake and a second rotation element of the second planetary gear set; a fifth shaft connected to a third rotation element of the second planetary gear set, a first rotation element of the third planetary gear set, a third clutch, and a fourth clutch; a sixth shaft connected to a second brake, the third clutch, and a first rotation element of the fourth planetary gear set; and an output shaft connected to the fourth clutch and the second rotation element of the fourth planetary gear set.

The first brake may be intermittently connected between the fourth shaft and the transmission housing, the second brake may be intermittently connected between the sixth shaft and the transmission housing, the first clutch may be intermittently connected between the input shaft and the first shaft, the second clutch may be intermittently connected between the input shaft and the third shaft, the third clutch may be intermittently connected between the fifth shaft and the sixth shaft, and the fourth clutch may be intermittently connected between the fifth shaft and the output shaft.

The first brake may be intermittently connected between the second rotation element of the second planetary gear set and the transmission housing, the second brake may be intermittently connected between the first rotation element of the fourth planetary gear set and the transmission housing, the first clutch may be intermittently connected between the input shaft and the first rotation element of the first planetary gear set, the second clutch may be intermittently connected between the input shaft and the third rotation element of the first planetary gear set, the third clutch may be intermittently connected between the first rotation element of the third planetary gear set and the first rotation element of the fourth planetary gear set, and the fourth clutch may be intermittently connected between the first rotation element of the third planetary gear set and the second rotation element of the fourth planetary gear set.

One end portion of the first clutch and one end portion of the second clutch may be connected to the input shaft, the other end portion of the first clutch, the first sun gear of the first planetary gear set, the second sun gear of the second planetary gear set, and the third planet carrier of the third planetary gear set may be connected to the first shaft, the first planet carrier of the first planetary gear set, the third ring gear of the third planetary gear set, and the fourth ring gear of the fourth planetary gear set may be connected to the second shaft, the other end portion of the second clutch and the first ring gear of the first planetary gear set may be connected to the third shaft, the first brake and the second planet carrier of the second planetary gear set may be connected to the fourth shaft, the second ring gear of the second planetary gear set, the third sun gear of the third planetary gear set, one end portion of the third clutch, and one end portion of the fourth clutch may be connected to the fifth shaft, the second brake, a remaining end portion of the third clutch, and the fourth sun gear of the fourth planetary gear set may be connected to the sixth shaft, and the fourth planet carrier of the fourth planetary gear set and a remaining end portion of the fourth clutch may be connected to the output shaft.

As described above, according to an exemplary embodiment of the present invention, four planetary gear sets may be combined such that the rotation speed and direction are changed by selective intermittent operations using the rotation elements of the planetary gear sets and the plurality of friction elements. With such a shifting action, the vehicle may be driven by implementing gear ratios of at least ten forward stages and at least one reverse stage. Accordingly, by multi-staging the shift stages of the automatic transmission, it is possible to improve fuel efficiency, and to improve power performance, and to improve quiet-running property of a vehicle due to the use of an operating point of low revolutions per minute (RPM) band of the engine.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a view representing an operation table for each shift stage of the transmission according to an exemplary embodiment of the present invention.

Figure 1:
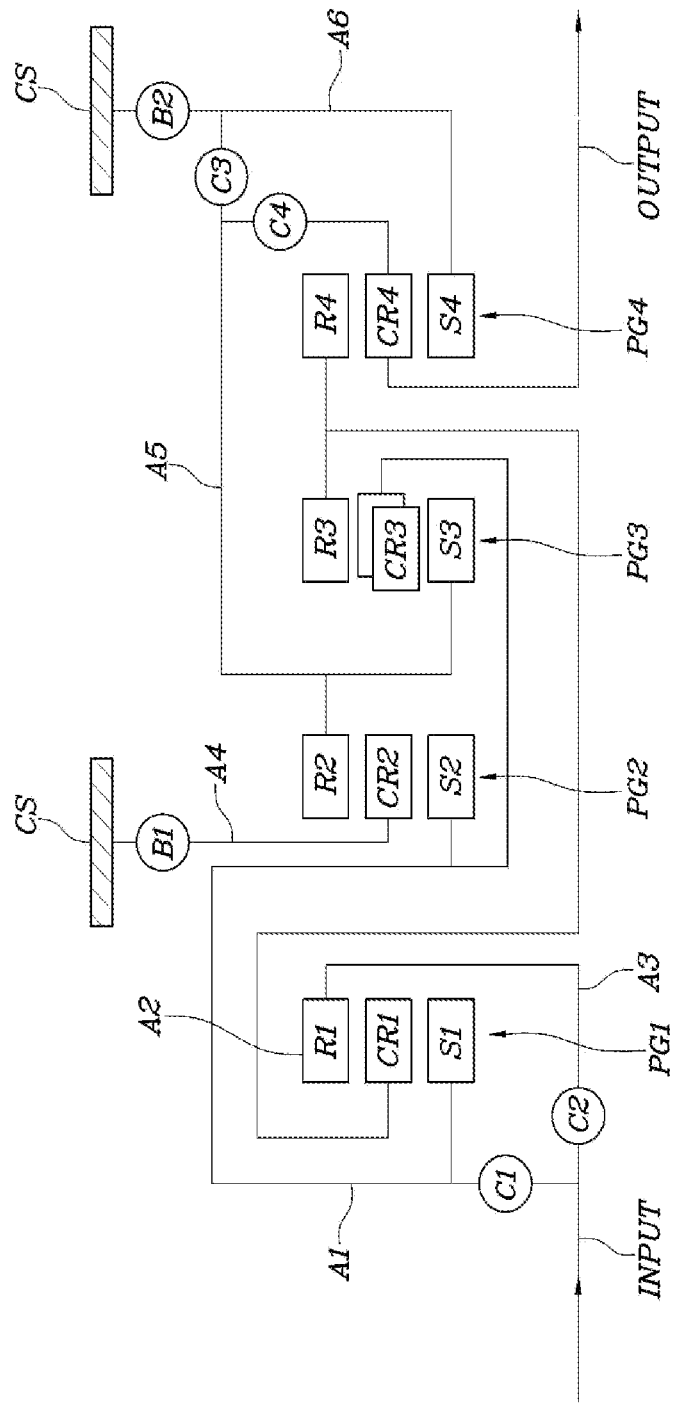
FIG. 1 is a view illustrating the structure of a vehicle transmission according to an exemplary embodiment of the present invention as an example.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made more specifically to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, embodiments of the present invention will be described more specifically with reference to the accompanying drawings.

A vehicle transmission of the present invention includes a first planetary gear set PG1, a second planetary gear set PG2, a third planetary gear set PG3, and a fourth planetary gear set PG4, and three or more rotation elements are rotatably provided in each of these planetary gear sets.

FIG. 1 illustrates the structure of a vehicle transmission according to an exemplary embodiment of the present invention. Referring to FIG. 1, a first rotation element of the first planetary gear set PG1 may be directly connected to a first rotation element of the second planetary gear set PG2, may be directly connected to a second rotation element of the third planetary gear set PG3, and may be selectively connectable to an input shaft INPUT by a friction element.

Before explaining the connecting relationships between the first planetary gear set PG1 and the second planetary gear set PG2 and between the third planetary gear set PG3 and the fourth planetary gear set PG4, the structures of the first, second, third and fourth planetary gear sets PG1, PG2, PG3, and PG4 will be described. The first planetary gear set PG1, the second planetary gear set PG2, and the fourth planetary gear set PG4 may be single pinion planetary gear sets, and the third planetary gear set PG3 may be a double pinion planetary gear set.

Furthermore, the respective first rotation elements of the first, second, third and fourth planetary gear sets PG1, PG2, PG3, and PG4 may be first, second, third and fourth sun gears S1, S2, S3, and S4; the respective second rotation elements of the first, second, third and fourth planetary gear sets PG1, PG2, PG3, and PG4 may be first, second, third and fourth planet carriers CR1, CR2, CR3, and CR4; and the respective third rotation elements of the first, second, third and fourth planetary gear sets PG1, PG2, PG3, and PG4 may be first, second, third and fourth ring gears R1, R2, R3, and R4.

Based on this, a connection structure of the first planetary gear set PG1 will be described more specifically. The first sun gear S1, which is the first rotation element of the first planetary gear set PG1 may be directly connected to the second sun gear S2, and may be connected to the third planet carrier CR3.

Furthermore, the first sun gear S1 may be selectively connectable to the input shaft INPUT by a first clutch C1 which is one of the friction elements.

Subsequently, the second rotation element of the first planetary gear set PG1 may be directly connected to the third rotation element of the third planetary gear set PG3, and may be directly connected to the third rotation element of the fourth planetary gear set PG4.

For example, the first planet carrier CR1, which is the second rotation element of the first planetary gear set PG1, may be directly connected to the third ring gear R3, and may also be directly connected to the fourth ring gear R4.

Furthermore, the third rotation element of the first planetary gear set PG1 may be selectively connectable to the input shaft INPUT by a friction element.

For example, the first ring gear R1, which is the third rotation element of the first planetary gear set PG1, may be selectively connectable to the input shaft INPUT by the second clutch C2, which is one of the friction elements.

Next, referring to the second planetary gear set PG2, the second rotation element of the second planetary gear set PG2 can be operated as a selective fixed element by a friction element.

For example, the second planet carrier CR2, which is the second rotation element of the second planetary gear set PG2, may be selectively connectable to the transmission housing CS by a first brake B1, which is one of the friction elements.

Furthermore, the third rotation element of the second planetary gear set PG2 may be directly connected to the first rotation element of the third planetary gear set PG3.

For example, the second ring gear R2, which is the third rotation element of the second planetary gear set PG2, may be directly connected to the third sun gear S3.

Next, referring to the third planetary gear set PG3, the first rotation element of the third planetary gear set PG3 may be selectively connectable to the first rotation element of the fourth planetary gear set PG4 by a friction element, and may be selectively connectable to the second rotation element of the fourth planetary gear set PG4 by a friction element.

For example, the third sun gear S3, which is the first rotation element of the third planetary gear set PG3, may be selectively connectable to the fourth sun gear S4 by the third clutch C3, which is one of the friction elements.

Also, the third sun gear S3 may be selectively connectable to the fourth planet carrier CR4 by the fourth clutch C4, which is one of the friction elements.

Furthermore, the third rotation element of the third planetary gear set PG3 may be directly connected to the third rotation element of the fourth planetary gear set PG4.

For example, the third ring gear R3, which is the third rotation element of the third planetary gear set PG3, may be directly connected to the fourth ring gear R4.

Next, referring to the fourth planetary gear set PG4, the first rotation element of the fourth planetary gear set PG4 may be operated as a selective fixed element by a friction element.

For example, the fourth sun gear S4, which is the first rotation element of the fourth planetary gear set PG4, may be selectively connectable to the transmission housing CS by a second brake B2, which is one of the friction elements.

Furthermore, the second rotation element of the fourth planetary gear set PG4 may be directly connected to an output shaft OUTPUT.

For example, the fourth planet carrier CR4, which is the second rotation element of the fourth planetary gear set PG4, may be directly connected to the output shaft OUTPUT.

Furthermore, in the vehicle transmission having the above-described configuration, the first planetary gear set PG1, the second planetary gear set PG2, the third planetary gear set PG3, and the fourth planetary gear set PG4 may be sequentially disposed in the axial direction of the input shaft INPUT.

In the transmission structure of the present invention, a friction element may be connected to at least one of the rotation elements forming the planetary gear sets to control the rotation of the rotation element, and the friction elements may be first and second brakes B1 and B2 and first, second, third and fourth clutches C1, C2, C3, and C4.

The first brake B1 may be intermittently connected between the second planet carrier CR2, which is the second rotation element of the second planetary gear set PG2, and the transmission housing CS.

The second brake B2 may be intermittently connected between the fourth sun gear S4, which is the first rotation element of the fourth planetary gear set PG4, and the transmission housing CS.

The first clutch C1 may be intermittently connected between the input shaft INPUT and the first sun gear S1, which is the first rotation element of the first planetary gear set PG1.

The second clutch C2 may be intermittently connected between the input shaft INPUT and the first ring gear R1, which is the third rotation element of the first planetary gear set PG1.

The third clutch C3 may be intermittently connected between the third sun gear S3, which is the first rotation element of the third planetary gear set PG3, and the fourth sun gear S4, which is the first rotation element of the fourth planetary gear set PG4.

The fourth clutch C4 may be intermittently connected between the third sun gear S3, which is the first rotation element of the third planetary gear set PG3, and the fourth planet carrier CR4, which is the second rotation element of the fourth planetary gear set PG4.

Meanwhile, the vehicle transmission according to an exemplary embodiment of the present invention may be configured by connecting rotation elements and friction elements, which form respective planetary gear sets, to the input shaft INPUT, first to sixth shafts A1 to A6, and the output shaft OUTPUT.

Referring to FIG. 1, one end portion of the first clutch C1 and one end portion of the second clutch C2 may be connected to the input shaft INPUT.

The first shaft A1 may be connected to the other end portion of the first clutch C1, the first sun gear S1 of the first planetary gear set PG1, the second sun gear S2 of the second planetary gear set PG2, and the third planet carrier CR3 of the third planetary gear set PG3.

The second shaft A2 may be connected to the first planet carrier CR1 of the first planetary gear set PG1, the third ring gear R3 of the third planetary gear set PG3, and the fourth ring gear R4 of the fourth planetary gear PG4.

The third shaft A3 may be connected to the other end portion of the second clutch C2 and the first ring gear R1 of the first planetary gear set PG1.

The fourth shaft A4 may be connected to the first brake B1 and the second planet carrier CR2 of the second planetary gear set PG2.

The fifth axis A5 may be connected to the second ring gear R2 of the second planetary gear set PG2, the third sun gear S3 of the third planetary gear set PG3, one end portion of the third clutch C3, and one end portion of the fourth clutch C4.

The sixth shaft A6 may be connected to the second brake B2, the other end portion of the third clutch C3, and the fourth sun gear S4 of the fourth planetary gear set PG4.

The fourth planet carrier CR4 of the fourth planetary gear set PG4 and the other end portion of the fourth clutch C4 may be connected to the output shaft OUTPUT.

The first brake B1 and the second brake B2 may be connected to the transmission housing CS.

For example, the first brake B1 may be intermittently connected between the fourth shaft A4 and the transmission housing CS, the second brake B2 may be intermittently connected between the sixth axis A6 and the transmission housing CS, and the first clutch C1 may be intermittently connected between the input shaft INPUT and the first shaft A1.

The second clutch C2 may be intermittently connected between the input shaft INPUT and the third shaft A3, the third clutch C3 may be intermittently connected between the fifth shaft A5 and the sixth shaft A6, and the fourth clutch C4 may be intermittently connected between the fifth shaft A5 and the output shaft OUTPUT.

The first brake B1 may be intermittently connected between the second planet carrier CR2, which is the second rotation element of the second planetary gear set PG2, and the transmission housing CS.

The second brake B2 may be intermittently connected between the fourth sun gear S4, which is the first rotation element of the fourth planetary gear set PG4, and the transmission housing CS.

The first clutch C1 may be intermittently connected between the input shaft INPUT and the first sun gear S1, which is the first rotation element of the first planetary gear set PG1.

The second clutch C2 may be intermittently connected between the input shaft INPUT and the first ring gear R1, which is the third rotation element of the first planetary gear set PG1.

The third clutch C3 may be intermittently connected between the third sun gear S3, which is the first rotation element of the third planetary gear set PG3, and the fourth sun gear S4, which is the first rotation element of the fourth planetary gear set PG4.

The fourth clutch C4 may be intermittently connected between the third sun gear S3, which is the first rotation element of the third planetary gear set PG3, and the fourth planet carrier CR4, which is the second rotation element of the fourth planetary gear set PG4.

FIG. 2 represents an operation table for each shift position of the transmission according to an exemplary embodiment of the present invention. For example, to implement the gear ratio of a first stage, the first clutch C1, the first brake B1, and the third clutch C3 are engaged with each other, and all the remaining friction elements are opened to form the gear ratio of the first stage.

To implement the gear ratio of a second stage, the first clutch C1, the first brake B1, and the second brake B2 are engaged with each other, and all the remaining friction elements may be opened to form the gear ratio of the second stage. The remaining shift stages may also be implemented by implementing a gear ratio corresponding to a related shift stage through an intermittent operation as represent in the operation table.

As described above, according to an exemplary embodiment of the present invention, four planetary gear sets and six friction elements may be combined such that the rotation speed and direction are changed by selective intermittent operations using the rotation elements of the planetary gear sets and the plurality of friction elements. With such a shifting action, the vehicle may be driven by implementing gear ratios of at least ten forward stages and at least one reverse stage. Accordingly, by multi-staging the shift stages of the automatic transmission, it is possible to improve fuel efficiency, and to improve power performance and quiet-running property of a vehicle due to the use of an operating point of a low RPM band of the engine.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle transmission comprising:
   an input shaft and an output shaft;
   a first planetary gear set, a second planetary gear set, a third planetary gear set, and a fourth planetary gear set, which are provided to transmit rotational force between the input shaft and the output shaft, and each of which includes first, second, and third rotation elements; and
   six friction elements connected to the first, second, and third rotation elements of the first to fourth planetary gear sets,
   wherein the first rotation element of the first planetary gear set is fixedly connected to the first rotation element of the second planetary gear set and the second rotation element of the third planetary gear set,
   the second rotation element of the first planetary gear set is fixedly connected to the third rotation element of the third planetary gear set and the third rotation element of the fourth planetary gear set, the third rotation element of the second planetary gear set is fixedly connected to the first rotation element of the third planetary gear set, the third rotation element of the third planetary gear set is fixedly connected to the third rotation element of the fourth planetary gear set, and the second rotation element of the fourth planetary gear set is fixedly connected to the output shaft.

2. The vehicle transmission of claim 1, wherein the first rotation element of the first planetary gear set is selectively connectable to the input shaft by one of the six friction elements and the third rotation element of the first planetary gear set is selectively connectable to the input shaft by another one of the six friction elements, the second rotation element of the second planetary gear set is selectively fixed to a transmission housing by another one of the six friction elements, the first rotation element of the third planetary gear set is selectively connectable to the first rotation element of the fourth planetary gear set by another one of the six friction elements and the second rotation element of the fourth planetary gear set by another one of the six friction elements, and the first rotation element of the fourth planetary gear set is selectively fixed to the transmission housing by another one of the six friction elements.

3. The vehicle transmission of claim 2, wherein the second rotation element of the second planetary gear set is selectively connectable to the transmission housing by a first brake among the six friction elements, and the first rotation element of the fourth planetary gear set is selectively connectable to the transmission housing by a second brake among the six friction elements.

4. The vehicle transmission of claim 3, wherein the input shaft and the first rotation element of the first planetary gear set is selectively connectable to each other by a first clutch among the six friction elements, the input shaft and the third rotation element of the first planetary gear set is selectively connectable to each other by a second clutch among the six friction elements, the first rotation element of the third planetary gear set and the first rotation element of the fourth planetary gear set is selectively connectable to each other by a third clutch, and the first rotation element of the third planetary gear set and the second rotation element of the fourth planetary gear set are selectively connectable to each other by a fourth clutch.

5. The vehicle transmission of claim 2, wherein the first planetary gear set, the second planetary gear set, and the fourth planetary gear set are single pinion planetary gear sets, and the third planetary gear set is a double pinion planetary gear set, and each first rotation element of the first to fourth planetary gear sets are first, second, third and fourth sun gears, respectively, each second rotation element of the first to fourth planetary gear sets are first, second, third and fourth planet carriers, respectively, and each third rotation elements of the first to fourth planetary gear sets are first, second, third and fourth ring gears, respectively.

6. A vehicle transmission comprising a first planetary gear set, a second planetary gear set, a third planetary gear set, and a fourth planetary gear set, each of which has three or more rotation elements including first, second, and third rotation elements, wherein the vehicle transmission further includes:

an input shaft connected to a first clutch and a second clutch;

a first shaft connected to the first clutch, the first rotation element of the first planetary gear set, the first rotation element of the second planetary gear set, and the second rotation element of the third planetary gear set;

a second shaft connected to the second rotation element of the first planetary gear set, the third rotation element of the third planetary gear set, and the third rotation element of the fourth planetary gear set;

a third shaft connected to the second clutch and the third rotation element of the first planetary gear set;

a fourth shaft connected to a first brake and the second rotation element of the second planetary gear set;

a fifth shaft connected to the third rotation element of the second planetary gear set, the first rotation element of the third planetary gear set, a third clutch, and a fourth clutch;

a sixth shaft connected to a second brake, the third clutch, and the first rotation element of the fourth planetary gear set; and an output shaft connected to the fourth clutch and the second rotation element of the fourth planetary gear set.

7. The vehicle transmission of claim 6, wherein the first brake selectively connects the fourth shaft and a transmission housing, the second brake selectively connects the sixth shaft and the transmission housing, the first clutch selectively connects the input shaft and the first shaft, the second clutch selectively connects the input shaft and the third shaft, the third clutch selectively connects the fifth shaft and the sixth shaft, and the fourth clutch selectively connects the fifth shaft and the output shaft.

8. The vehicle transmission of claim 7, wherein the first brake selectively connects the second rotation element of the second planetary gear set and the transmission housing, the second brake selectively connects the first rotation element of the fourth planetary gear set and the transmission housing, the first brake selectively connects the input shaft and the first rotation element of the first planetary gear set, the second brake selectively connects the input shaft and the third rotation element of the first planetary gear set, the third brake selectively connects the first rotation element of the third planetary gear set and the first rotation element of the fourth planetary gear set, and the fourth brake selectively connects the first rotation element of the third planetary gear set and the second rotation element of the fourth planetary gear set.

9. The vehicle transmission of claim 6, wherein a first end portion of the first clutch and a first end portion of the second clutch are connected to the input shaft, a second end portion of the first clutch, the first sun gear of the first planetary gear set, the second sun gear of the second planetary gear set, and the third planet carrier of the third planetary gear set are connected to the first shaft, the first planet carrier of the first planetary gear set, the third ring gear of the third planetary gear set, and the fourth ring gear of the fourth planetary gear set are connected to the second shaft,
a second end portion of the second clutch and the first ring gear of the first planetary gear set are connected to the third shaft,
the first brake and the second planet carrier of the second planetary gear set are connected to the fourth shaft,
the second ring gear of the second planetary gear set, the third sun gear of the third planetary gear set, a first end portion of the third clutch, and a first end portion of the fourth clutch are connected to the fifth shaft,
the second brake, a second end portion of the third clutch, and the fourth sun gear of the fourth planetary gear set are connected to the sixth shaft, and
the fourth planet carrier of the fourth planetary gear set and a second end portion of the fourth clutch are connected to the output shaft.

* * * * *